US008534418B2

(12) United States Patent
Pachale (10) Patent No.: US 8,534,418 B2
(45) Date of Patent: Sep. 17, 2013

(54) PLATE ABSORBER (71) Applicant: Airbus Operations GmbH, Hamburg (DE)

(72) Inventor: Urs Pachale, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/653,937

(22) Filed: Oct. 17, 2012

(65) Prior Publication Data

US 2013/0037346 A1    Feb. 14, 2013

Related U.S. Application Data (63) Continuation of application No. PCT/EP2011/055437, filed on Apr. 7, 2011.

(60) Provisional application No. 61/325,920, filed on Apr. 20, 2010.

(30) Foreign Application Priority Data

Apr. 20, 2010  (DE) .......................... 10 2010 015 638

(51) Int. Cl.
E04B 1/82  (2006.01)
(52) U.S. Cl.
USPC ......................................... 181/292; 181/284
(58) Field of Classification Search
USPC .................................................. 181/292, 284
See application file for complete search history.

(56) References Cited

U.S. PATENT DOCUMENTS

| 4,823,909 | A | 4/1989 | Nakamura et al. |
| 5,041,323 | A | 8/1991 | Rose et al. |
| 5,106,668 | A | 4/1992 | Turner et al. |
| 6,007,890 | A | 12/1999 | DeBlander |
| 7,631,727 | B2 | 12/2009 | Thomas et al. |
| 2004/0016595 | A1* | 1/2004 | Andre et al. .................. 181/290 |
| 2006/0145004 | A1 | 7/2006 | Drost et al. |
| 2006/0272279 | A1 | 12/2006 | Palumbo et al. |

(Continued)

FOREIGN PATENT DOCUMENTS

| DE | 19804718 A1 | 8/1999 |
| DE | 696 15 751 T2 | 7/2002 |
| DE | 102005016653 A1 | 10/2006 |
| FR | 2929746 A1 | 10/2009 |

OTHER PUBLICATIONS

International Search Report and Written Opinion for Application No. PCT/EP2011/055437 dated Oct. 4, 2011.

*Primary Examiner* — Forrest M Phillips
(74) *Attorney, Agent, or Firm* — Lerner, David, Littenberg, Krumholz & Mentlik, LLP (57) ABSTRACT An aircraft cabin plate absorber includes a supporting panel, a cover panel and an intermediate layer which is arranged between the supporting panel and the cover panel. The cover panel includes a cover layer which is visible from the cabin space, and is arranged on the supporting panel on the side facing the sound inside the cabin space. The cover panel is fastened to the supporting panel by the intermediate layer, and comprises at least one connecting region, in which it is connected to the supporting panel, and at least one absorption region, in which it is arranged so as to oscillate with respect to the supporting panel. The panel is optimized in term of space requirement and weight for use in aircraft and has improved sound absorption properties.

9 Claims, 4 Drawing Sheets

(56) References Cited

U.S. PATENT DOCUMENTS

| | | | |
|---|---|---|---|
| 2010/0187039 A1* | 7/2010 | Holmgren | 181/284 |
| 2011/0073407 A1* | 3/2011 | Ayle | 181/292 |
| 2011/0186380 A1* | 8/2011 | Beauvilain et al. | 181/292 |
| 2012/0037448 A1* | 2/2012 | Douglas et al. | 181/292 |
| 2012/0090693 A1* | 4/2012 | Chelin et al. | 137/15.1 |
| 2012/0285768 A1* | 11/2012 | Douglas et al. | 181/292 |

* cited by examiner

PLATE ABSORBER

CROSS-REFERENCE TO RELATED APPLICATIONS

This application continuation of International Application No. PCT/EP2011/055437, filed Apr. 7, 2011, which claims priority from German Patent Application No. 10 2010 015 638.8 filed Apr. 20, 2010 and claims the benefit of the filing date of U.S. Provisional Patent Application No. 61/325,920 filed Apr. 20, 2010, the disclosures of which are hereby incorporated herein by reference.

BACKGROUND OF THE INVENTION

The present invention relates to an aircraft cabin plate absorber for sound absorption in an aircraft cabin. The invention further relates to a device for sound absorption in an aircraft cabin and to an aircraft comprising a cabin space which is arranged inside the fuselage and which comprises a device for sound absorption.

Sound-absorbing plates or panels are used in aircraft, for example aeroplanes, in the cabin region, so as to improve the acoustic properties inside the cabin space, in that sound is absorbed by the panels, that is to say the sound input or sound level inside the cabin as a whole is reduced. Increased comfort demands on spaces in general are also increasingly accompanied by demands on the quality of stays in aeroplanes, since high requirements are placed, among other things, on the spatial acoustics during flight operation. For this purpose, it is desirable to use panels for sound absorption in the internal space, for example of aeroplane passenger cabins, so as to minimise the noise levels in the cabin interior. For example, for improving the acoustic properties of aircraft cabins, a sound-absorbing panel is known from DE 10 2005 016653 in which a sandwich panel is made acoustically transparent, and a porous absorber, which is effective over a wide band, is arranged on the panel side facing away from the cabin. However, the absorber leads to an increased space requirement and additional weight. However, an increase in weight leads to both economic and ecological drawbacks for the operation of the aeroplane or other aircraft. In connection with constantly increasing fuel costs and the generally acknowledged impact of $CO_2$ emission, the aspect of component weight is taking on central importance in component development in the field of aviation. Likewise, the aspect of space requirement is of significance, since for efficient use of an aircraft, as much as possible of the interior space which is enclosed by the fuselage should be available for use. In particular in heavily frequented regions inside the cabin, for example the galleys or aisles and the entrance regions, sound absorption is often superseded by utility.

There may be a need to provide a panel which is optimised in terms of space requirement and weight for use in aircraft having improved sound absorption properties.

BRIEF SUMMARY OF THE INVENTION

In accordance with an exemplary embodiment of the invention, an aircraft cabin plate absorber for sound absorption is provided in an aircraft cabin, comprising a supporting panel, a cover panel and an intermediate layer which is arranged between the supporting panel and the cover panel. The cover panel is arranged on the supporting panel on the side facing the sound inside the cabin space. The cover panel comprises a cover layer which is visible from the cabin space. The supporting panel is formed so as to hold the cover panel, the cover panel being fastened to the supporting panel by the intermediate layer. The cover panel comprises at least one connecting region, in which it is connected to the supporting panel, and at least one absorption region, in which it can oscillate with respect to the supporting panel.

The term "oscillate" refers to a movement of the absorption region in the direction perpendicular to the surface of the cover panel, for example a movement of the surface alternately towards and away from the space, brought about for example by the sound impinging on the surface. Depending on the fastening, this may lead to a temporary deformation of the cover panel; for example, in the case of a planar cover panel with fastening along the edges, this may lead to bulging in and out during the oscillation. The oscillation may for example be a microscopic deformation, for example a deformation which is not visible to the users or passengers in the aeroplane.

In this way, it is possible to provide an absorber which can absorb sound, which impinges on the panel or absorber, by way of the oscillation of the cover panel. In this way, a plate absorber can be provided at a minimal space requirement. Since the respective components can be adapted so as to be optimised to the respective function, the component weight can also be minimised.

In accordance with a further aspect of the invention, the cover panel can oscillate at a microscopic amplitude in the at least one absorption region. For example, the cover panel oscillates with an oscillation amplitude in the micrometer range.

For example, the oscillation has an oscillation amplitude of at most 100 micrometers. In accordance with a further aspect of the invention, the oscillation amplitude is at most 50 micrometers. In accordance with a further embodiment of the invention, the oscillation amplitude is at most 10 micrometers.

In this way, on the one hand sound absorption can be achieved by way of the oscillating cover plate or cover panel, and on the other hand a wall element can be provided which feels stable if touched, for example if leant on, this being of particular importance in aisle regions or entrance regions. In this context, an excessively flexible surface could make the user feel unsafe. Since the cover panel can only oscillate at a microscopic amplitude, the user is given an impression of stability if he leans against it with his hand, for example, since the cover plate does not yield perceptibly under the pressure applied by the hand.

In accordance with a further aspect of the invention, the cover panel is fastened to the supporting panel in such a way that at least one air cushion which is enclosed between the cover panel and the supporting panel acts together with the cover panel as a spring/mass system (spring=air cushion, mass=cover panel) which absorbs sound energy at the resonance point. This interplay of the plate mass and the air as a spring makes it possible for the plate absorber construction to work more efficiently.

In accordance with a further aspect of the invention, a plurality of connecting regions and a plurality of absorption regions are provided.

In this way, a cabin panel having a large area, for example, can also be provided as a plate absorber.

In accordance with a further aspect of the invention, the cover panel may oscillate when sound waves impinge so as to absorb the impinging sound at least in part. In accordance with a further aspect of the invention, the cover panel is made flexible in such a way that excitation to emit sound as a result of structure-borne sound is minimised.

This is of particularly great significance in light constructions such as the partitions, that is to say the divisions inside the aircraft cabin, which are mostly not decoupled in terms of structure-borne sound.

In accordance with a further aspect of the invention, the supporting panel is formed so as to transmit loads to a sub-construction.

These loads are for example the inherent weight and any loads which result from use, for example loads acting on the surface, for example caused by people leaning thereon.

According to embodiment of the invention, the cover panel is not completely immobile, or immobile with respect to the supporting panel, but rather is held in such a way that it can oscillate in portions so as to absorb sound energy.

In accordance with a further aspect of the invention, the absorption properties and the static properties of the plate absorber can be adapted by way of a different construction of the at least one connecting region and of the at least one absorption region.

In this way, a visually identical plate absorber can be adapted to different regions of use inside the aircraft cabin, for example.

In accordance with a further aspect of the invention, the supporting panel is formed with a core layer and a first cover layer, the first cover layer being arranged facing away from the sound field in the cabin space.

In accordance with a further aspect of the invention, the first cover layer is in the form of a laminate, and the entire surface thereof is connected to the core layer.

In accordance with a further aspect of the invention, the first cover layer is made acoustically closed.

In this way, for example a sound absorption panel can be provided which also simultaneously suppresses or at least reduces the sound input into the cabin through the cabin wall or the cabin panel.

In accordance with a further aspect of the invention, the first cover layer is made airtight.

In this way, it can be provided that there is no undesired air exchange through the panel; this can be of significance for climate control, for example in a cabin wall in the region of the fuselage construction, that is to say in a cabin wall as a partition between the cabin region and the hollow space between the cabin facing and the outer wall construction or fuselage construction of the aeroplane.

In accordance with an exemplary embodiment of the invention, the supporting panel is formed with a core layer and a first cover layer, the first cover layer being arranged facing away from the sound field in the cabin space and the core layer having tubular or honeycombed cells, which extend openly, continuously over the thickness of the core layer, and which are mutually separated by cell walls and are formed uniformly.

A sub-construction of this type, also known as a honeycomb core, provides the most stable possible static properties at the same time as a very low weight.

In accordance with an exemplary embodiment of the invention, the core layer comprises a matrix prepreg, which is connected to the core layer, on the side facing the intermediate layer.

Together with the first cover layer and the matrix prepreg, the core layer forms a sandwich construction, the rigidity of which, that is to say the static properties of which, are reduced by the two outer layers, that is to say the first cover layer and the matrix prepreg. In other words, the supporting panel is reinforced by the matrix prepreg and also by the first cover layer. At the same time, the matrix prepreg has the advantage that it makes the air volume of the supporting panel available as a resilient layer (and thus makes relatively wide-band absorption possible) and at the same time contributes to the rigidity.

In accordance with a further aspect of the invention, the air volume of the cells of the core layer is accessible via the matrix prepreg, and the air volume is exploited for the absorption.

In accordance with a further aspect of the invention, the intermediate layer adhesively connects the supporting panel to the cover panel in the at least one connecting region.

In accordance with a further aspect of the invention, the intermediate layer is in the form of a laminate, the laminate comprising an adhesive layer in the connecting regions on each of the two outer surfaces.

In accordance with an exemplary embodiment of the invention, the intermediate layer is in the form of a continuous layer comprising at least one recess, the at least one recess forming the at least one absorption region.

In accordance with a further aspect of the invention, a plurality of recesses are provided.

For example, the recesses take up a fraction of at least 50% of the total area of the absorber, that is to say the surface area of the cover panel.

For example, the recesses take up a fraction of 90% of the total area.

This provides that the cover panel is held sufficiently, and at the same time, regions in which the cover plate or cover panel can oscillate so as to absorb sound energy are provided in the region of the recesses.

In accordance with a further aspect of the invention, the two panels, that is to say the supporting panel and the cover panel, are glued to one another via the intermediate layer, increasing the load-bearing capacity of the supporting panel.

In accordance with a further aspect of the invention, the intermediate layer is of a thickness such that it is provided, as a function of the dimensions of the recess or recesses, that the cover plate can oscillate at a microscopic amplitude, without contacting the supporting panel during the oscillation.

In accordance with an exemplary embodiment of the invention, the intermediate layer comprises a plurality of mutually spaced connecting regions, so as to connect the cover panel to the supporting panel in these connecting regions.

For example, the connecting regions may be arranged differently depending on the region of use, so as to provide secure holding of the cover panel.

In accordance with a further aspect of the invention, the intermediate layer comprises strip-shaped connecting regions.

In accordance with an exemplary embodiment of the invention, the intermediate layer is in the form of a foamed material layer or non-woven fabric layer, the entire surface of which is connected to the supporting panel and the cover panel, the intermediate layer having a low compression rigidity.

For example, the foamed material layer or non-woven fabric layer has a rigidity in the region of $$5 \div 50 \frac{MPa}{m}.$$

In accordance with a further aspect, the air cushion between the supporting panel and the cover panel is of a particular static rigidity.

For example, the air cushion has a rigidity in the region of $$5 \div 50 \frac{MPa}{m}.$$

In accordance with a further aspect of the invention, the entire surface of the intermediate layer is connected to the supporting panel and the cover panel and the rigidity of the full-surface connecting layer is in the region of $$5 \div 50 \frac{MPa}{m}.$$

In accordance with a further aspect, the connecting layer is interrupted, and may for example be either resilient or non-resilient.

In accordance with a further aspect, the intermediate layer is permeable to air at least in part, for example in regions, and this is applicable to all of the described embodiments or the possible combinations thereof.

In accordance with a further aspect, the intermediate area is impermeable to air. This may be provided for all of the disclosed examples as well as combinations. In this way, room air-related aspects and building physics requirements can be taken into account, for example the penetration of air humidity into the wall construction or else the deposition of dirt and dust particles in the construction, but at the same time a degree of compromise is required, since the absorption effect is somewhat reduced.

In accordance with a further aspect of the invention, the compression rigidity of the intermediate layer is in the region of or less than the compression rigidity of the air cushion.

In accordance with a further aspect of the invention, the shear rigidity, that is to say the rigidity parallel to the panel layers, may be as high as desired, unlike the compression rigidity.

A construction of this type of the intermediate layer provides on the one hand that the cover panel is fastened and on the other hand that the cover panel is held, in such a way that, at the same time, an oscillation at a microscopic amplitude is possible as a function of the construction of the foamed material layer or non-woven fabric layer. In accordance with a further aspect of the invention, the intermediate layer is made flexible.

In accordance with a further aspect of the invention, the intermediate layer is in the form of a foamed material layer or non-woven fabric layer and is connected to the supporting panel and the cover panel in regions, the intermediate layer having a low compression rigidity.

In this way, besides the connected regions in which oscillation is possible as a result of the properties of the foamed material or the non-woven fabric, additional regions are also provided in which absorption is possible as a result of the cover plate oscillating.

In accordance with a further aspect of the invention, the intermediate layer is made open-pore or permeable to air.

In this way, the entire air space or the air volume behind the cover plate or cover panel can be made available for sound absorption, including the space taken up by the intermediate layer.

In accordance with a further aspect of the invention, the foamed material layer or the non-woven fabric layer is provided with an adhesive layer on each side.

In accordance with a further aspect of the invention, additional adhesive layers are provided between the intermediate layer and the supporting panel and cover panel.

In accordance with a further aspect of the invention, the foamed material layer or non-woven fabric layer is in the form of a continuous layer having at least one recess.

In accordance with a further aspect of the invention, the foamed material layer or non-woven fabric layer comprises a plurality of individual connecting regions, so as to connect the cover panel to the supporting panel in these connecting regions.

In accordance with an exemplary embodiment of the invention, the cover panel is formed with a cover panel core layer and a second cover layer which is connected to the cover panel core layer, the second core layer being arranged facing the sound field.

In this way, a cover panel can be provided which can be adapted so as to be optimised to the static requirements, that is to say the carrying capacity of the cover panel, by way of the cover panel core layer, and to the requirements on the surface by way of the formation of the second cover layer.

In accordance with a further aspect of the invention, the second cover layer is in the form of a laminate, for example consisting of different layers which are interconnected to form one layer.

In accordance with a further aspect of the invention, the second cover layer is in the form of a prepreg. This may for example be a pretreated material or a pretreated material combination, for example a laminate, which is finished in further working, manufacture or assembly steps. This may involve material properties and also shapes and surface properties. A prepreg is a semi-finished product which consists of continuous fibres and an uncured polymer matrix, for example a thermosetting matrix.

In accordance with a further aspect of the invention, a third cover layer is provided which is connected to the cover panel core layer and is arranged on the side facing the intermediate layer.

In this way, the cover panel can be formed as a type of sandwich construction, so as to take up as little space as possible while at the same time providing sufficient rigidity.

In accordance with a further aspect of the invention, the cover panel core layer comprises tubular or honeycombed cells, which extend openly, continuously over the thickness of the core layer, and which are mutually separated by cell walls and are formed uniformly.

For example, the cover panel may be formed as a half-comb or else as a full-comb construction, oscillation being possible and it being possible to improve the static properties of the supporting panel by way of the cover panel at the same time.

In accordance with an exemplary embodiment of the invention, the cover panel is in the form of a laminate which is supported on the supporting panel via the connecting regions.

In accordance with a further aspect of the invention, the cover panel is in the form of a fibre-reinforced decorative film. For example, the decorative film comprises a microperforation.

In accordance with a further aspect of the invention, the cover panel comprises a cover panel honeycomb structure, consisting of a core, a layer impermeable to air (facing the connecting layer) and a microperforated layer (facing the cabin).

In accordance with a further aspect of the invention, the cover panel is provided with a woven fabric for the visual finish.

In accordance with a further aspect of the invention, the cover panel comprises leather as a surface material as a cover.

As a result of the construction with a decorative film, a woven fabric or leather, a visually pleasing surface can be provided, with the same acoustic effect, that is to say the same absorption. For example, materials may be used which are of the company colour of an airline or which are adapted in some other way to the company layout or corporate identity. In particular, the visible surface may also be provided with logos or other graphical designs.

Depending on the region of use of the plate absorber inside the aircraft cabin, the surface material may also be provided with a coating which has a self-cleaning effect; for example, a coating of this type for a woven fabric may be formed using titanium dioxide. In this way, soiling of the surface, for example in aisle regions or entrance or exit regions, can be prevented.

In accordance with a further aspect of the invention, a non-woven fabric is provided between the material of the surface and the cover panel core layer.

In this way, the surface material, which in simple terms is primarily a decorative element, can be lined. In this way, for example unevenness in the region of the underlying construction can be smoothed out in such a way that a higher surface precision can be provided. On the other hand, in this way different tactile properties of the cabin panel can also be achieved. Moreover, the non-woven fabric, or alternatively a foamed material layer, can provide an additional improvement in the acoustic properties of the plate absorber.

In accordance with an exemplary embodiment of the invention, a device for sound absorption is provided in an aircraft cabin, in which the cabin space is enclosed at least in part by an internal space facing which is formed by panels, at least some of the panels being formed as a plate absorber in accordance with any one of the preceding embodiments or any one of the preceding aspects.

In accordance with an exemplary embodiment of the invention, an aircraft is also provided, and is formed with a cabin space which is arranged inside the fuselage and which comprises at least one device for sound absorption in accordance with the preceding paragraph.

In this way an aircraft, for example an aeroplane, is provided in which the acoustic internal space relations in the cabin are improved, to the effect that the internal noise in the aircraft is reduced as a result of the improved absorption properties of the internal space facing. In this context, the plate absorber according to an embodiment of the invention provides that, despite the improvement in the acoustic properties, there is no substantial increase in the component weight, which would at the same time lead to an increase in the fuel requirement of the aircraft in operation. A further advantage is that, despite the improved acoustic properties, the space requirement is only slightly increased, and as a result more space is available for the actual use of the cabin, and this leads to a further increase in the user comfort and also at the same time to better exploitation of the aircraft, which in turn is economically advantageous.

It should be noted that the embodiments described above and also in the following and the individual features can of course be combined with one another, and this may in some cases also lead to advantageous effects which go beyond the sum of the individual effects.

It should be noted that, based on the wording thereof, the above description of various aspects of the invention and the following illustrative descriptions and the claims are directed to an aircraft, which in the context of the present invention means in particular aeroplanes, but also helicopters.

BRIEF DESCRIPTION OF THE DRAWINGS

These and other aspects of the present invention will be discussed in the following, with reference to the exemplary embodiments of the invention which are described hereinafter by way of the appended drawings, in which.

DETAILED DESCRIPTION

Figure 1:
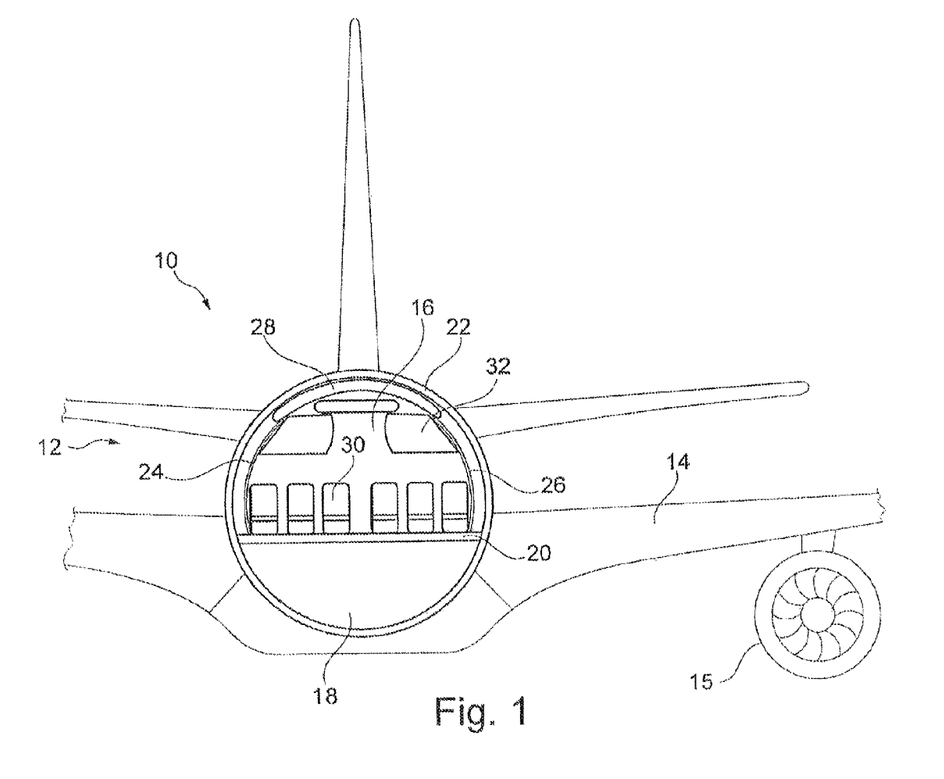
FIG. 1 is a cross-section through an aircraft comprising a cabin facing having plate absorbers according to an embodiment of the invention.

FIG. 1 shows an aircraft in the form of an aeroplane 10, comprising an aeroplane fuselage 12 and two wings 14 which are attached laterally thereto and on which engines 15 are provided. In FIG. 1, the aeroplane fuselage is shown sectioned transverse to the longitudinal axis thereof. The aeroplane fuselage 12 comprises an upper cabin region 16 and a cargo region 18 arranged below, which are mutually separated by a horizontally extending floor 20. The aeroplane fuselage 12 further comprises a substantially peripheral aeroplane outer skin which is fastened to an aeroplane fuselage structure (not shown in greater detail). The aeroplane fuselage structure consists, in simple terms, of a type of supporting structure consisting of formers and stringers, and provides a stable construction for receiving the external and internal loads.

The cabin space is mostly enclosed by an internal space facing. For this purpose, in the cabin region 16 which is arranged above the floor 20, lateral cabin facings 24, 26 and an upper cabin facing 28, which is provided in the upper region, are located along the outer wall 22. For simplicity, the aeroplane outer skin 22 is shown without window openings, but this is easy to visualise.

The elements of the cabin facing 24, 26, 28 enclose, together with the floor 20, an internal space, that is to say the cabin. Inside the cabin, seats 30 for the passengers are arranged, for example. Luggage compartments 32 for example are further provided, and are located substantially above the rows of seats and serve to accommodate the passengers' hand luggage. Further, various supply ducts are also provided in the cabin region 16, for example for an oxygen supply, electrical supply or air conditioning system, but are not shown in greater detail in FIG. 1. Partition elements in the region of the cabin seating and installed elements, such as toilet elements, and other internal means, such as cooking regions, are also not shown. Entrance regions comprising door openings are also provided in the fuselage construction, but are not shown in greater detail.

The external loads, for example wind loads and loads resulting from pressure differences on the fuselage region, are transmitted from the outer skin 22 to the support structure of the aeroplane fuselage and thus dissipated. So as to provide suitable conditions for the stay in the cabin, thermal insulation is generally also provided in the outer wall construction.

Moreover, the outer wall construction is made as strongly sound-insulating as possible, so as to keep sound input from the turbines 15 into the cabin 16 to a minimum. Besides the function of the cabin facing elements 24, 26, 28 for sealing the space, according to an embodiment of the invention they are also exploited for influencing the acoustic relations inside the cabin 16. For this purpose, at least some of the cabin panels 24, 26, 28 are formed as aircraft cabin plate absorber so as to absorb sound, as is explained in greater detail by way of the following drawings.

In addition to the acoustic requirements, cabin panels are also subject to the requirement that the surfaces should be easy to clean, in particular in heavily frequented regions. Moreover, the cabin panels must also meet design-related requirements.

In some regions, above all in the aisle regions or galleys and the entrance regions, the sound pressure level can be reduced by additionally introducing absorbers without a major additional introduction of mass, as is explained in greater detail in connection with the description of the illustrative embodiments of an plate absorber.

Figure 2:
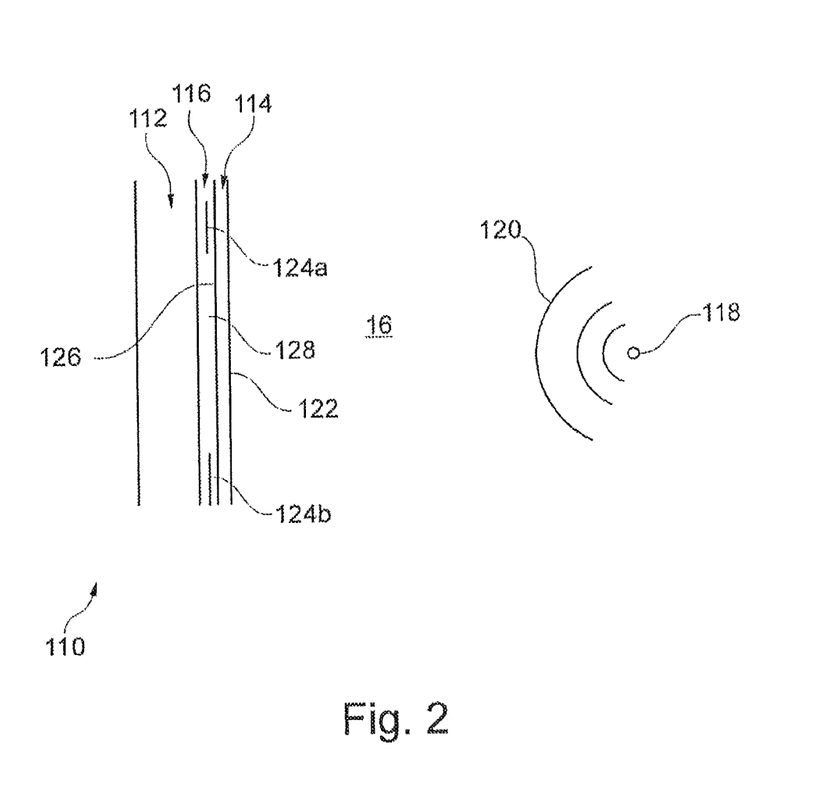
FIG. 2 is a schematic sectional drawing of a first embodiment of a plate absorber according to an embodiment of the invention.

FIG. 2 shows a plate absorber 110 for sound absorption in an aircraft cabin. The plate absorber comprises a supporting panel 112, a cover panel 114 and an intermediate layer 116 which is arranged between the supporting panel and the cover panel. The cover panel is arranged on the supporting panel on the side which faces the sound, illustrated as a sound source 118 with sound waves 120, inside the cabin space, for example the cabin space 16 of FIG. 1. The cover panel 114 comprises a cover layer 122 which is visible from the cabin space 16. The supporting panel 112 is formed so as to hold the cover panel 114, the cover panel being fastened to the supporting panel by the intermediate layer 116.

The cover panel comprises at least one connecting region 124, in which it is connected to the supporting panel. The cover panel 114 further comprises at least one absorption region 126, in which it is arranged so as to oscillate with respect to the supporting panel 112.

For example, the cover panel 114 may oscillate in the at least one absorption region 126 at a microscopic amplitude.

As is merely shown schematically in FIG. 2, the cover panel 114 is for example fastened to the panel 112 in such a way that at least one air cushion 128, which is enclosed between the cover panel and the supporting panel, acts as a spring/mass system, which can absorb sound energy at the resonance point. For example, a plurality of absorption regions 128 are provided.

In this way, the cover panel 114 is able to oscillate when sound waves impinge thereon so as to absorb the impinging sound at least in part.

For the use of light constructions such as partitions, which are mostly not decoupled in terms of structure-borne sound, the cover panel 114 is made flexible in such a way that excitation to emit sound as a result of structure-borne sound is minimised.

It is not shown in greater detail that the supporting panel 112 is formed so as to transmit loads to a sub-construction (not shown).

Figure 3:
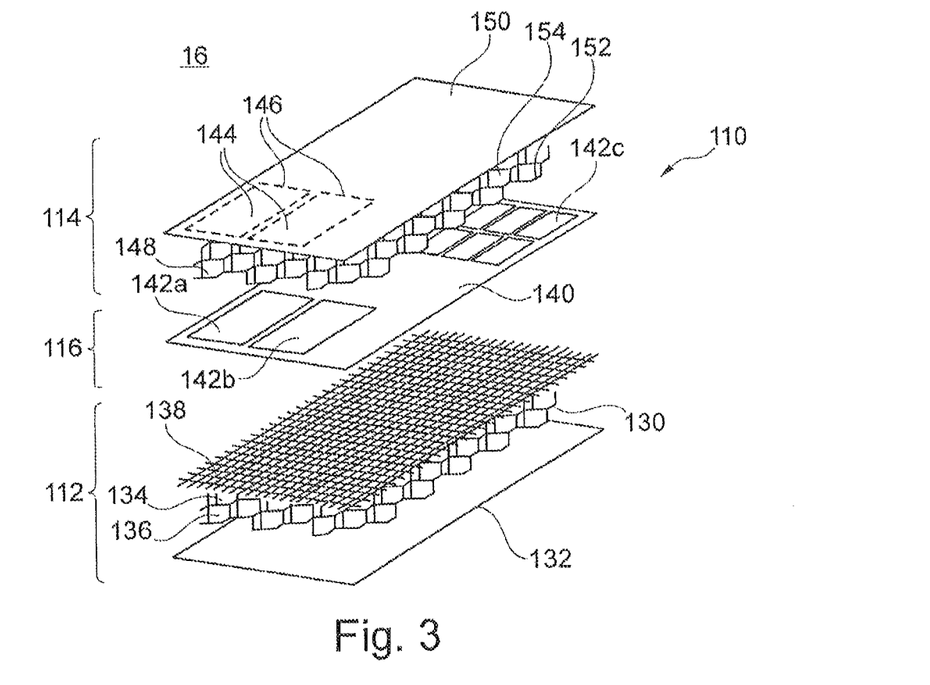
FIG. 3 is a schematic exploded view of a first embodiment of a plate absorber according to an embodiment of the invention.

In accordance with a further variant embodiment, which is shown in FIG. 3, the supporting panel 112 is formed with a core layer 130 and a first cover layer 132, the first cover layer 132 being arranged facing away from the sound field in the cabin space 16.

It should be noted that the drawings of the following FIGS. 3 to 6 are arranged rotated 90° anticlockwise relative to the drawing of FIG. 2. The layer sequence shown in an exploded view is illustrated in such a way that the aforementioned sound field or the cabin space 16 is arranged above the layers, in such a way that the side facing away from the sound field is arranged in the lower region of the drawings.

For example, the core layer 130 comprises tubular or honeycombed cells 134, which extend openly, continuously over the thickness of the core layer, and which are mutually separated by cell walls 136 and are formed uniformly.

In the embodiment shown in FIG. 3, the core layer 130 comprises a matrix prepreg 138, which is connected to the core layer, on the side facing the intermediate layer 116.

For example, the air volume of the cells 134 of the core layer 130 is exploited for absorption via the matrix prepreg 138.

The intermediate layer 116 is in the form of a continuous layer 140 comprising at least one recess 142, it being possible for example for the recesses to be in the form of rectangular, relatively large openings 142a, 142b or else relatively small rectangular openings 142c. Of course, the recesses may also be of any other form, and may be made uniform or else completely different.

The recesses 142 provide that the cover panel 114 is not connected to the supporting layer or the supporting panel 112 in these regions, in such a way that the cover plate or cover panel can oscillate there in such a way that it acts to absorb sound. The cover panel therefore comprises absorption regions 144 which are shown in an exemplary manner in FIG. 3 by way of dashed rectangles 146. It should be noted that the absorption regions above the relatively small rectangular openings or recesses 142c have not been shown, for visual reasons or for better legibility. The at least one connecting region is formed by the regions of the layer 140 in which for example an adhesive layer is provided. In the example shown, this may be the case over the entire surface, excluding the recesses, or else only in particular regions.

In accordance with one illustrative embodiment, which is also shown in FIG. 3, the cover panel 114 comprises a cover panel core layer 148 and a second cover layer 150, which is connected to the cover panel core layer 148. The second cover layer 150 is arranged facing the sound field, that is to say the cabin internal space 16.

For example, the cover panel core layer 148 may be a honeycomb structure comprising tubular or honeycombed cells 152, which extend openly, continuously over the thickness of the cover panel core layer, and which are mutually separated by cell walls 154 and are formed uniformly.

The first cover layer is for example a prepreg.

For example, the cover panel 114 is formed with a half-comb structure, that is to say with a core to which a laminate is glued on one side. As a result of the gluing on one side, the cover plate can be made relatively flexible.

The open side of the core of the cover plate or cover panel is glued via the intermediate layer 116, which may for example also be a laminate layer, to the matrix prepreg 138 of the supporting panel, that is to say the supporting structure 112.

Figure 6:
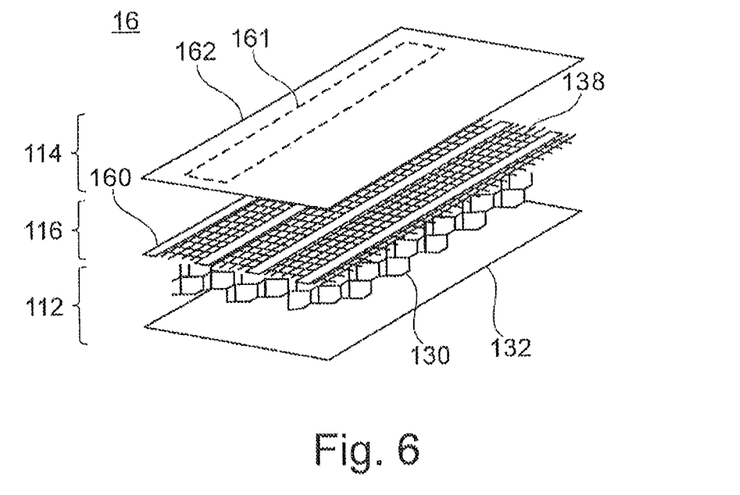
FIG. 6 shows a further embodiment of a plate absorber according to an embodiment of the invention.

The half-comb of the cover panel may also be replaced with another relatively flexible layer, for example a fibre-reinforced decorative film, as is shown in connection with FIG. 6.

Figure 4:
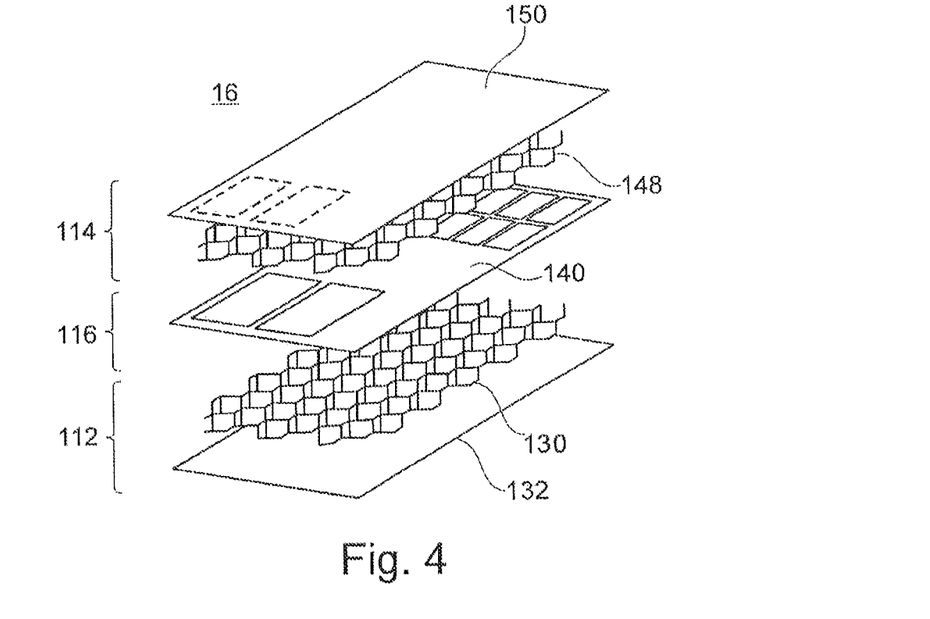
FIG. 4 shows a further embodiment of a plate absorber according to an embodiment of the invention.

In accordance with a further illustrative embodiment, which is shown in FIG. 4, the supporting panel 112 may be formed with the core layer 130 and the first cover layer 132, but without the matrix prepreg layer or matrix prepreg 138. This does mean that the static properties are influenced, in comparison with FIG. 3, by the omission of the matrix prepreg 138, but in this way the supporting layer, that is to say the supporting panel 112, is simpler to manufacture.

Figure 5:
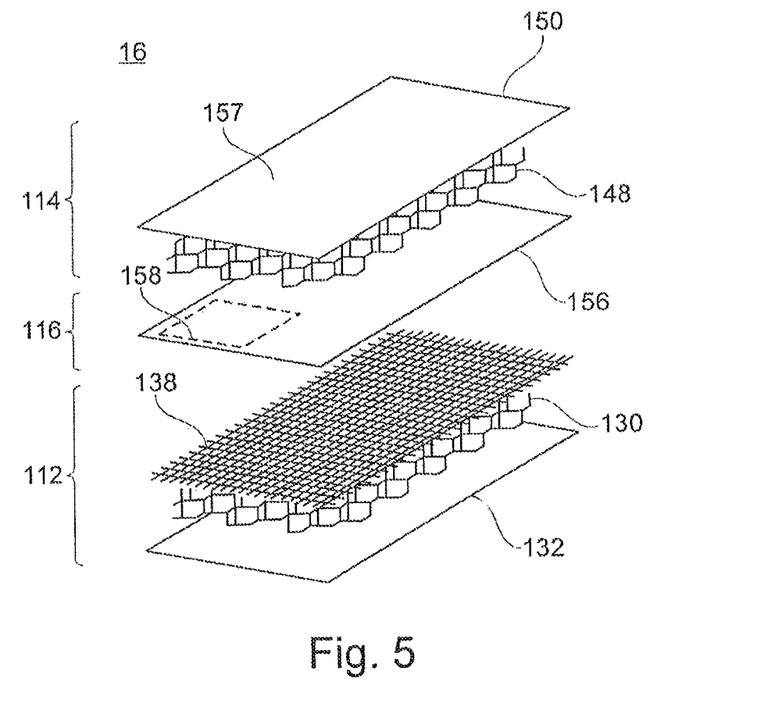
FIG. 5 shows a further embodiment of a plate absorber according to an embodiment of the invention.

In accordance with a further illustrative embodiment, which is shown in FIG. 5, the intermediate layer 116 is in the form of a non-woven fabric layer or foamed material layer 156. For example, the entire surface of the foamed material layer or non-woven fabric layer 156 is connected to the supporting panel 112, for example the matrix prepreg 138, although this can also be omitted (see FIG. 4), and to the cover panel 114, the intermediate layer having a low rigidity and having a flexibility such that the cover plate, that is to say the cover panel 114, is held on the one hand, but on the other hand can also oscillate microscopically so as to have an acoustically absorbing effect. In this embodiment, the at least one connecting region and the at least one absorption region so to speak overlap. The cover panel therefore has a planar absorption region 157.

For example, the air cushion between the supporting panel and the cover panel, for example in the case of FIG. 3 the air gap between the cover layer 150 and the cover layer 132, is of a particular static rigidity, for example in the region of $$5 - 50 \frac{MPa}{m}.$$

In accordance with one embodiment (not shown in greater detail), the foamed material layer or non-woven fabric layer 156 is formed with at least one recess, which is illustrated in FIG. 5 as a dashed rectangle 158 for improved clarity.

By adapting the compression rigidity and the flexibility inside the non-woven fabric or foamed material layer 156, regions can also be formed which oscillate to different degrees, that is to say have different degrees of absorption, although this is not shown in greater detail.

In accordance with a further illustrative embodiment, which is shown in FIG. 6, the intermediate layer 116 comprises a plurality of mutually spaced connecting regions 160, so as to connect the cover panel 114 to the supporting panel 112 in these connecting regions 160. FIG. 6 shows the intermediate layer 116 in the direct vicinity of the matrix prepreg 138. For example, the connecting regions 160 may be configured for efficient production on the matrix prepreg, so as to be laid on the honeycomb together with the matrix prepreg. For example, the connecting regions 160 are made stripshaped and form the connecting regions 124 in such a way that absorption regions 161 are produced between them.

In accordance with a further embodiment, the connecting regions are distributed over the surface in a type of grid, for example as rectangles or points, in such a way that one or more contiguous absorption regions are produced.

FIG. 6 further shows that the cover panel 114 is formed as a laminate 162, neglecting the construction with a honeycomb in accordance with the previously disclosed embodiments. The laminate 162 is for example a fibre-reinforced decorative film or a reinforced woven fabric. Depending on the rigidity of the cover layer 114, the connecting regions 160 are correspondingly closer together, since the cover panel 114 is supported directly on the matrix prepreg 138 of the supporting panel 112. The connecting regions 160 may for example be double-sided adhesive strips.

The above-disclosed embodiments of FIGS. 2 to 6 relate to different aspects of the invention, it being noted that the individual different features of the embodiments can also be combined in other variants. Thus for example the laminate 162 shown in FIG. 6 can be arranged on a continuously formed intermediate layer 140 comprising recesses 142 or else on an intermediate layer 116 which is formed as a foamed material layer or non-woven fabric layer, as is disclosed in connection with FIG. 5. Other combinations which are not explicitly mentioned are also provided.

Of course, the embodiments which are mentioned in the introduction to the description may also be combined with the aspects of the invention with the embodiments shown in FIGS. 2 to 6 in different variants.

It should further be noted that the term "comprising" or "comprise" does not exclude the possibility of other elements, just as the terms "a" and "an" do not exclude the possibility of a plurality of elements, as long as nothing to the contrary is specified in this connection. The reference numerals used serve merely for improved comprehension, and should not be taken as limiting, the scope of protection of the invention being given by the claims.

The invention claimed is:

1. An aircraft cabin plate absorber for sound absorption in an aircraft cabin, comprising:
   a supporting panel,
   a cover panel; and
   an intermediate layer arranged between the supporting panel and the cover panel;
   wherein the cover panel is arranged on the supporting panel on the side facing the sound inside a cabin space;
   wherein the cover panel comprises a cover layer visible from the cabin space;
   wherein the supporting panel is formed so as to hold the cover panel and wherein the cover panel is fastened to the supporting panel by the intermediate layer;
   wherein the cover panel comprises at least one connecting region, in which connecting region, the cover panel is connected to the supporting panel, and at least one absorption region, in which absorption region, the cover panel is configured to oscillate with respect to the supporting panel;
   wherein the intermediate layer adhesively connects the supporting panel to the cover panel in the at least one connecting region; and
   wherein the intermediate layer is in the form of a continuous layer comprising at least one recess, the at least one recess forming the at least one absorption region.

2. The plate absorber according to claim 1, wherein the supporting panel comprises a core layer and a first cover layer, the first cover layer being arranged facing away from the sound field in the cabin space and the core layer having uniformly formed tubular or honeycombed cells extending openly, continuously over the thickness of the core layer, and mutually separated by cell walls.

3. The plate absorber according to claim 2, wherein the core layer comprises a matrix prepreg connected to the core layer, on the side facing the intermediate layer.

4. The plate absorber according to claim 1, wherein the intermediate layer comprises a plurality of mutually spaced connecting regions, so as to connect the cover panel to the supporting panel in the connecting regions.

5. The plate absorber according to claim 1, wherein the intermediate layer comprises a foamed material layer or non-woven fabric layer,
   wherein the entire surface of the foamed material or the non-woven fabric layer being connected to the supporting panel and the cover panel, and
   wherein the intermediate layer has a low compression rigidity.

6. The plate absorber according to claim 1, wherein the cover panel comprises a cover panel core layer and a second cover layer connected to the cover panel core layer, wherein the second core layer is arranged facing the sound field.

7. The plate absorber according to claim 1, wherein the cover panel comprises a laminate supported on the supporting panel via the connecting regions.

8. A device for sound absorption in an aircraft cabin, in which the cabin space is enclosed at least in part by an internal space facing the cabin space, the device comprising a plurality of panels, wherein at least one of the panels comprises a plate absorber, the plate absorber comprising:
- a supporting panel,
- a cover panel; and
- an intermediate layer arranged between the supporting panel and the cover panel;
- wherein the cover panel is arranged on the supporting panel on the side facing the sound inside a cabin space;
- wherein the cover panel comprises a cover layer visible from the cabin space;
- wherein the supporting panel is formed so as to hold the cover panel and wherein the cover panel is fastened to the supporting panel by the intermediate layer;
- wherein the cover panel comprises at least one connecting region, in which connecting region, the cover panel is connected to the supporting panel, and at least one absorption region, in which absorption region, the cover panel is configured to oscillate with respect to the supporting panel;
- wherein the intermediate layer adhesively connects the supporting panel to the cover panel in the at least one connecting region; and
- wherein the intermediate layer is in the form of a continuous layer comprising at least one recess, the at least one recess forming the at least one absorption region.

9. An aircraft comprising a cabin space arranged inside the fuselage comprising a device for sound absorption, the device comprising a plurality of panels, wherein at least one of the panels comprises a plate absorber, the plate absorber comprising:
- a supporting panel,
- a cover panel; and
- an intermediate layer arranged between the supporting panel and the cover panel;
- wherein the cover panel is arranged on the supporting panel on the side facing the sound inside a cabin space;
- wherein the cover panel comprises a cover layer visible from the cabin space;
- wherein the supporting panel is formed so as to hold the cover panel and wherein the cover panel is fastened to the supporting panel by the intermediate layer;
- wherein the cover panel comprises at least one connecting region, in which connecting region, the cover panel is connected to the supporting panel, and at least one absorption region, in which absorption region, the cover panel is configured to oscillate with respect to the supporting panel;
- wherein the intermediate layer adhesively connects the supporting panel to the cover panel in the at least one connecting region; and
- wherein the intermediate layer is in the form of a continuous layer comprising at least one recess, the at least one recess forming the at least one absorption region.

* * * * *